(12) United States Patent
Sulc et al.

(10) Patent No.: US 6,708,510 B2
(45) Date of Patent: Mar. 23, 2004

(54) ADVANCED REFRIGERATION SYSTEM

(75) Inventors: Vladimir Sulc, Minnetonka, MN (US); Michal Hegar, Praha (CZ)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 10/210,852

(22) Filed: Aug. 1, 2002

(65) Prior Publication Data

US 2003/0037553 A1 Feb. 27, 2003

Related U.S. Application Data

(60) Provisional application No. 60/311,637, filed on Aug. 10, 2001.

(51) Int. Cl.[7] .......................... F25D 21/06; F25B 47/00
(52) U.S. Cl. ............................................. 62/151; 62/278
(58) Field of Search ........................ 62/278, 151, 81, 62/150, 159, 149, 160

(56) References Cited

U.S. PATENT DOCUMENTS

| | | |
|---|---|---|
| 2,715,317 A | 8/1955 | Rhodes |
| 2,969,655 A | 1/1961 | Salter |
| 3,074,249 A | 1/1963 | Henderson |
| 3,978,684 A | 9/1976 | Taylor |
| 3,978,685 A | 9/1976 | Taylor |
| 4,030,315 A | 6/1977 | Harnish |
| 4,137,726 A | 2/1979 | Watada |
| 4,266,405 A | 5/1981 | Trask |
| 4,537,047 A | 8/1985 | Seshadri et al. |
| 4,583,377 A | 4/1986 | Viegas |
| 4,646,539 A | 3/1987 | Taylor |
| 4,663,725 A | 5/1987 | Truckenbrod et al. |
| 4,720,980 A | 1/1988 | Howland |
| 4,727,728 A | 3/1988 | Brown |
| 4,748,818 A | 6/1988 | Satterness et al. |

(List continued on next page.)

*Primary Examiner*—Marc Norman
(74) *Attorney, Agent, or Firm*—Michael Best & Friedrich LLP

(57) ABSTRACT

A transportation refrigeration system operable in a cooling mode, a defrost mode, and a heating mode to condition air in an air-conditioned space. The system comprises a refrigeration circuit fluidly connecting a compressor, a condenser, a tank, and an evaporator. The evaporator is in thermal communication with the air-conditioned space. A heating circuit fluidly connects the compressor, the tank, the evaporator, and a heater. A defrost circuit fluidly connects the compressor, the tank, the evaporator, and the heater. The tank has a base and the first opening is spaced a first distance above the base and the third opening is spaced a second greater distance above the base.

38 Claims, 2 Drawing Sheets

U.S. PATENT DOCUMENTS

| | | |
|---|---|---|
| 4,748,825 A | 6/1988 | King |
| 4,765,149 A | 8/1988 | Shiga et al. |
| 4,850,197 A | 7/1989 | Taylor et al. |
| 4,885,916 A | 12/1989 | Arndt |
| 4,888,959 A | 12/1989 | Brown |
| 4,890,459 A | 1/1990 | Havemann |
| 4,912,933 A | 4/1990 | Renken |
| 4,926,655 A | 5/1990 | King |
| 4,932,219 A | 6/1990 | Howland et al. |
| 4,934,390 A | 6/1990 | Sapp |
| 5,001,908 A | 3/1991 | Mayer |
| 5,056,324 A | 10/1991 | Haley |
| 5,092,134 A | 3/1992 | Tagashira et al. |
| 5,105,906 A | 4/1992 | Wegner |
| 5,140,827 A | 8/1992 | Reedy |
| 5,152,152 A | 10/1992 | Brickner et al. |
| 5,168,713 A | 12/1992 | Howland |
| 5,172,560 A * | 12/1992 | Jurewicz et al. ............ 62/89 |
| 5,174,123 A | 12/1992 | Erickson |
| 5,214,918 A | 6/1993 | Oguni et al. |
| 5,226,294 A | 7/1993 | Mayer |
| 5,228,301 A | 7/1993 | Sjoholm et al. |
| 5,233,842 A | 8/1993 | Manning et al. |
| 5,259,204 A | 11/1993 | McKeown |
| 5,323,618 A | 6/1994 | Yoshida et al. |
| 5,335,511 A | 8/1994 | McKeown |
| 5,355,692 A | 10/1994 | Brownfield |
| 5,359,863 A | 11/1994 | Lewis |
| 5,361,595 A | 11/1994 | Shimura et al. |
| 5,377,493 A | 1/1995 | Friedland |
| 5,388,420 A | 2/1995 | Yoshida et al. |
| 5,400,609 A | 3/1995 | Sjoholm et al. |
| 5,408,836 A | 4/1995 | Sjoholm et al. |
| 5,410,889 A | 5/1995 | Sjoholm et al. |
| 5,415,006 A | 5/1995 | Renken et al. |
| 5,415,014 A | 5/1995 | Waldschmidt et al. |
| 5,423,190 A | 6/1995 | Friedland |
| 5,465,587 A | 11/1995 | Sjoholm et al. |
| 5,477,695 A | 12/1995 | Sjoholm et al. |
| 5,579,648 A | 12/1996 | Hanson et al. |
| 5,596,878 A | 1/1997 | Hanson et al. |
| 5,634,347 A | 6/1997 | Hanson et al. |
| 5,669,223 A | 9/1997 | Haley et al. |
| 5,711,161 A | 1/1998 | Gustafson |
| 5,778,690 A | 7/1998 | Hanson et al. |
| 6,095,427 A | 8/2000 | Hoium et al. |
| 6,311,507 B1 * | 11/2001 | Gameiro ................ 62/196.4 |
| 6,357,248 B1 | 3/2002 | Bongaards et al. |
| 6,367,269 B1 | 4/2002 | Hanson et al. |

\* cited by examiner

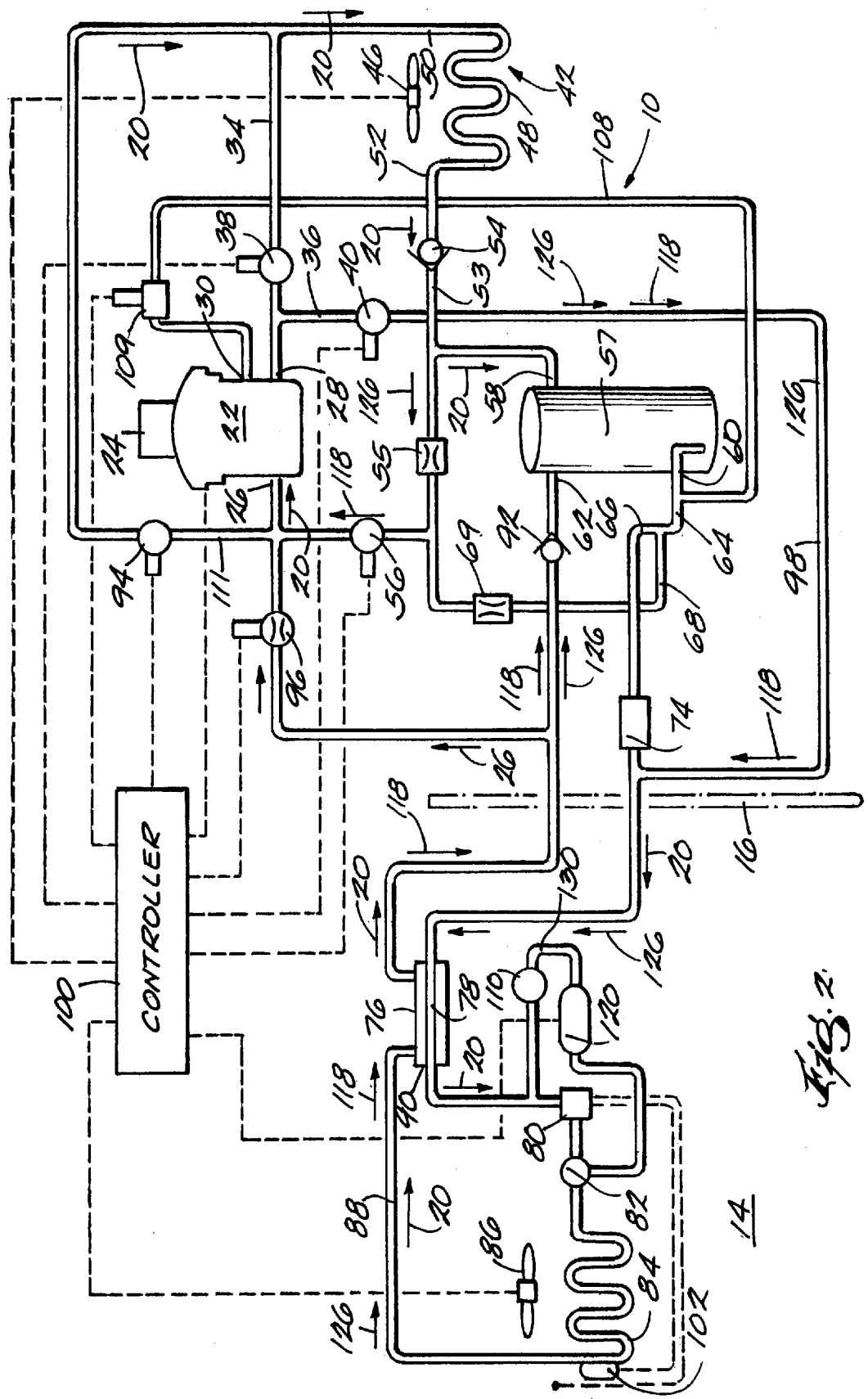

ADVANCED REFRIGERATION SYSTEM

CROSS-REFERENCE TO RELATED APPLICATION

This application claims priority under 35 U.S.C. §119 to provisional patent application No. 60/311,637, filed on Aug. 10, 2001.

FIELD OF THE INVENTION

The invention relates generally to air conditioning and refrigeration systems, and more specifically to a refrigeration system having a cooling mode, a heating mode, and a defrost mode and a method of operating the refrigeration system in the cooling, heating, and defrost modes.

BACKGROUND OF THE INVENTION

Conventional refrigeration systems are commonly used-to maintain the temperature of an air-conditioned space at or near a set point temperature and typically include a compressor, a condenser, an expansion valve, and an evaporator. Generally, refrigeration systems operate in cooling, heating, and defrost modes, depending, at least in part, upon the temperature of the air-conditioned space and the ambient temperature outside the air-conditioned space. When the temperature of the air-conditioned space is above the set point temperature, the refrigeration systems operate in the cooling mode to pull down the temperature in the air-conditioned space. During operation in the cooling mode, refrigerant is directed along a refrigerant circuit, which includes the condenser, a receiver tank, the expansion valve, the evaporator, and an accumulator tank.

When the temperature of the air conditioned space is below the set point temperature, the refrigeration systems operate in a heating mode. Additionally, to minimize the formation of ice and frost on the evaporator coil and to ensure that the refrigeration system is operating in the most efficient manner, refrigeration systems periodically operate in a defrost mode. When the system is switched from the cooling mode to the heating or defrost modes, hot refrigerant vapor is directed out of the compressor through a heating circuit, which includes a pan heater, the evaporator and the accumulator tank.

The heating and defrosting capacity of the system depends, at least in part, upon the volume of refrigerant being directed through the heating circuit. Therefore, it is desirable to ensure that a maximum amount of refrigerant is directed through the heating circuit during heating and defrost modes. Moreover, during heating and defrost modes, refrigerant which has accumulated in the condenser is unavailable for heating and defrosting. Therefore, it is desirable to ensure that refrigerant does not accumulate in condenser during heating and defrost modes.

SUMMARY OF THE INVENTION

According to the present invention, a transportation refrigeration system operable in a cooling mode, a defrost mode, and a heating mode to condition air in an air-conditioned space comprises a refrigeration circuit fluidly connecting a compressor, a condenser, a tank, and an evaporator. The evaporator is in thermal communication with the air-conditioned space. The system further comprises a heating circuit fluidly connecting the compressor, the tank, the evaporator, and a heater. The system also comprises a defrost circuit fluidly connecting the compressor, the tank, the evaporator, and the heater.

In some embodiments of the transportation refrigeration system, a substantial quantity of a refrigerant is directed through the refrigeration circuit during operation in the cooling mode. The substantial quantity of the refrigerant is also directed through the heating circuit during operation in the heating mode and the defrost mode.

The transportation refrigeration system includes a controller operable to selectively direct a quantity of a refrigerant through the refrigeration circuit, the defrosting circuit, and the heating circuit during operation in the cooling mode, the defrost mode, and the heating mode, respectively. A plurality of adjustable valves are distributed throughout the refrigeration system and are operable to selectively alter the flow of refrigerant through the refrigeration circuit, the heating circuit, and the defrost circuit.

The tank includes a first opening, a second opening, and a third opening. The refrigeration circuit is coupled to the first and second openings. The heating circuit is coupled to the first and third openings, and the defrost circuit is coupled to the first and third openings. The tank includes a base and the first opening is spaced a first distance above the base and the third opening is spaced a second smaller distance above the base. A quantity of oil is periodically mixed with the refrigerant in the compressor and the tank periodically separates at least some of the oil from the refrigerant.

Also according to the present invention, a method of conditioning air in an air-conditioned space with a transportation refrigeration system having a refrigerant comprises directing substantially all of the refrigerant through a refrigeration circuit during operation in a cooling mode. The refrigeration circuit includes a tank and an evaporator. The evaporator is in thermal communication with the air-conditioned space. The method further comprises directing substantially all of the refrigerant through a heating circuit during operation in a heating mode. The heating circuit includes the tank, the evaporator coil, and a heater. The method also includes directing substantially all of the refrigerant through a defrost circuit during operation in a defrost mode. The defrost circuit extends through the tank, the heater, and the evaporator.

In some embodiments, the refrigeration circuit includes a condenser and the method includes removing at least a substantial quantity of refrigerant from the condenser before initiating the defrost mode.

Other features and advantages of the invention will become apparent to those skilled in the art upon review of the following detailed description, claims, and drawings.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts:

FIG. 2 is a schematic drawing of the refrigeration system according to a second embodiment of the present invention.

DETAILED DESCRIPTION

Figure 1:
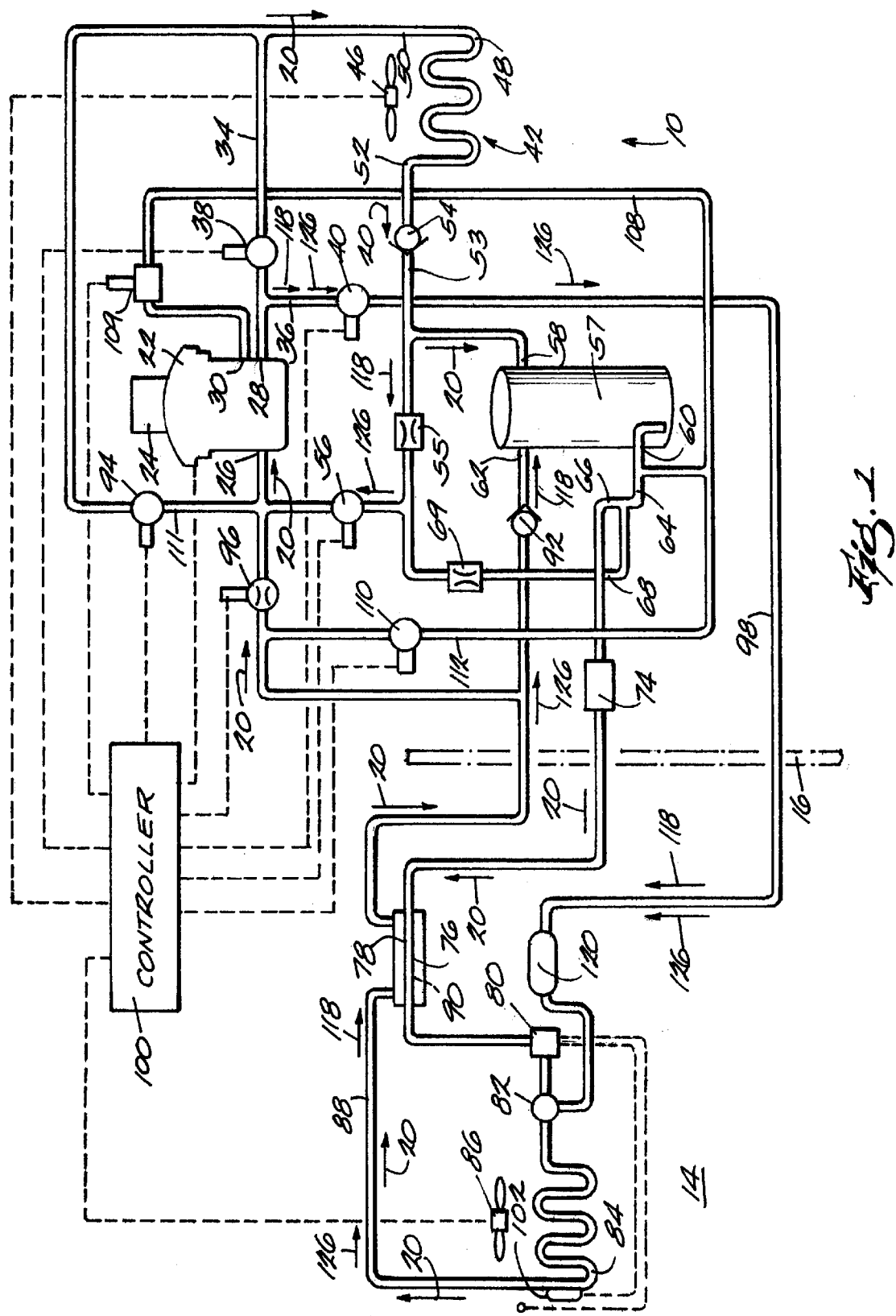
FIG. 1 is a schematic drawing of the refrigeration system according to a first embodiment of the present invention.

FIG. 1 illustrates a transportation refrigeration system 10 in accordance with the present invention. The refrigeration system 10 is operable to control the temperature of an air-conditioned space 14 to a predetermined set point temperature ("SP"). As shown in FIG. 1, the refrigeration system 10 is mounted on the front wall 16 of a truck or trailer. In other applications, the refrigeration system 10 can alternatively be used on other vehicles, such as a tractor-trailer combination, a container, and the like. Similarly, the refrigeration system 10 can be used to control the temperature in the passenger space of a vehicle, such as, for example, a bus or the passenger compartment of a truck.

As used herein and in the claims, the term "air-conditioned space" includes any space to be temperature and/or humidity controlled, including transport and stationary applications for the preservation of foods, beverages, plants, flowers, and other perishables, maintenance of a proper atmosphere for the shipment of industrial products, space conditioning for human comfort, and the like.

Additionally, as used herein and in the claims, the term "refrigerant" includes any conventional refrigerant including, but not limited to, chloroflourocarbons (CFCs), hydrocarbons, cryogens (e.g., $CO_2$ and $N_2$), and other known refrigerants. Additionally, one having ordinary skill in the art will appreciate that during operation of the present system additives and inclusions may be intentionally or inadvertently mixed with the refrigerant, such as, for example, motor oil, dirt, debris, rust, and the like.

In order to maintain the temperature in the air-conditioned space 14 at or near the set point temperature SP, the refrigeration system 10 can operate in a cooling mode, a heating mode, and a defrost mode. If the temperature in the air-conditioned space 14 is above the set point temperature SP, the refrigeration system 10 operates in the cooling mode. Conversely, if the temperature in the air-conditioned space 14 is below an acceptable range surrounding the set point temperature SP (e.g., in relatively cold climates), the refrigeration system 10 operates in the heating mode. Also, the refrigeration system 10 periodically operates in the defrost mode to maintain system efficiency and to prevent the formation of ice and frost.

With reference first to operation in the cooling mode, the refrigeration system 10 directs a refrigerant along a closed refrigeration circuit 20 (represented by arrows 20 in the figures), which extends through a compressor 22 that is driven by a prime mover, such as, for example, an internal combustion engine or an electric motor. In the illustrated embodiment, the compressor 22 is a hermetically sealed compressor and a compressor motor 24 is enclosed within the compressor housing. In other embodiments (not shown), other compressors, including open shaft, can also or alternately be used.

The compressor 22 includes an inlet 26 located on the low pressure or suction side of the compressor 22, a discharge 28 located on the high pressure or discharge side of the compressor 22, and a liquid injection port 30. The discharge 28 is connected to a flow path 34, which includes a first solenoid valve 38. A branch 36 intersects the flow path 34 upstream from the first solenoid valve 38 and includes a second solenoid valve 40.

During operation in the cooling mode, the second solenoid valve 40 is closed and the first solenoid valve 38 is opened. Therefore, refrigerant flowing out of the compressor 22 travels along the refrigeration circuit 20 through the flow path 34 and into a condenser 42. The condenser 42 includes a condenser fan 46 and a condenser coil 48 having an inlet 50 connected to the flow path 34. During operation in the cooling mode, the refrigerant continues along the refrigeration circuit 20 out of the condenser coil 48 into a liquid line 53, which includes a first check valve 54, a first throttling valve 55, and a third solenoid valve 56. The first check valve 54 is a one way check valve that enables liquid refrigerant to flow out of the condenser coil 48 and prevents liquid refrigerant from flowing back into the condenser coil 48. During operation in the cooling mode, the third solenoid valve 56 is closed, causing refrigerant leaving the condenser coil 48 to enter a tank 57.

The tank 57 includes a first opening 58, a second opening 60, and a third opening 62. During operation in the cooling mode, refrigerant travels along the refrigeration circuit 20, into the tank 57, through the first opening 58, and out of the tank 57 through the second opening 60. Preferably, a quantity of liquid refrigerant accumulates at the base of the tank 57.

From the second opening 60, the refrigerant continues along the refrigeration circuit 20 through a line 64. The line 64 has a first branch 66 and a second branch 68. The second branch 68 includes a throttling device 69 and intersects line 53 at a junction between the first throttling valve 55 and the third solenoid valve 56. The third solenoid valve 56 is closed during operation in the cooling mode. Additionally, the check valve 54 prevents refrigerant from flowing through the line 53 toward the condenser coil 48. Therefore, during operation in the cooling mode, refrigerant flows along the refrigeration circuit 20 through the first branch 66, a filter 74, and an internal heat exchanger 76.

The refrigerant traveling along the refrigeration circuit 20 continues through a liquid line 78 in the internal heat exchanger 76 to an expansion valve 80. The outlet of the expansion valve 80 is connected to a distributor 82 with a small orifice (not shown), which distributes refrigerant to inlets on the inlet side of an evaporator coil 84. The evaporator coil 84 is in thermal communication with the air-conditioned space 14 to control the temperature of air in the air-conditioned space 14. Specifically, during operation in the cooling mode, relatively warm air-conditioned space air is blown across the evaporator coil 84 by a fan or blower 86 and is cooled by contact with the relatively cold evaporator coil 84. At the same time, warmer air-conditioned space air warms the refrigerant in the evaporator coil 84, vaporizing and superheating most (if not all) of the refrigerant.

The vaporized and superheated refrigerant continues along the refrigeration circuit 20 out of the evaporator coil 84 via a vapor line 88 and is directed through a vapor portion 90 of the internal heat exchanger 76. The vaporized refrigerant passes through an adjustable throttling device 96 before re-entering the compressor 22 via the compressor inlet 26. Additionally, a second check valve 92 prevents saturated vapor and saturated liquid from reentering the vapor portion 90 of the internal heat exchanger 76 and the evaporator coil 84. The fourth solenoid valve 94 is closed to prevent superheated gas from the compressor discharge 28 from entering the inlet 26 via line 111. Once the refrigerant is returned to the compressor 22, the compressor 22 recompresses the refrigerant and recycles the refrigerant through the refrigerant circuit 20.

The refrigeration system 10 also includes a controller 100, which is preferably a microprocessor. The controller 100 receives temperature and pressure data from sensors (not shown), located throughout the refrigeration system 10. The controller 100 determines whether heating, cooling, or defrost is required by comparing the data collected by the sensors with the set point temperature SP.

During operation in the cooling mode, the controller 100 controls the cooling capacity of the refrigeration system 10 by opening and closing the first, second, third, and fourth solenoid valves 38, 40, 56, 94, adjusting the operating speed of the compressor 22, and opening and closing the adjustable throttling device 96.

Additionally, the controller 100 is programmed to inject liquid refrigerant into the compressor 22 to maintain the discharge temperature below a desired temperature limit. With reference to FIG. 1, a liquid injection line 108 extends from the second opening 60 of the storage tank 57 to the liquid injection port 30 on the compressor 22. When the controller 100 determines that liquid injection is required (e.g., sensors adjacent the discharge 28 record temperature values below a desired discharge temperature), the controller 100 opens a liquid injection valve 109, positioned along the liquid injection line 108, directing liquid refrigerant from the bottom of the storage tank 57 into the working space of the compressor 22 through the liquid injection line 108.

Also, if the compressor 22 is a hermetically sealed or semi-hermetically sealed compressor, as shown in the figures, the system preferably includes a line 111, which is used during extreme working conditions (e.g., during startup and when the ambient temperature is relatively high). In these circumstances, the adjustable throttling device 96 is incremented, reducing the flow of refrigerant through the refrigeration circuit 20, which reduces the discharge pressure of the compressor 22 and/or reduces the compressor supply power. In this manner, the system 10 cools the compressor motor 24 and maintains the discharge temperature below the maximum allowable limit. Additionally, if necessary, the liquid injection valve 109 can be opened simultaneously with the fifth solenoid valve 110 to maintain the desired compressor discharge temperature. Regardless of the type of compressor used, once the system 10 is no longer operating in extreme conditions, the controller 100 is programmed to maintain the compressor discharge temperature by periodically opening and closing the liquid injection valve 109, as described above.

Additionally, liquid injection through the fifth solenoid valve 110 may be required when the compressor 22 is a hermetically sealed compressor and the shaft speed is at a minimum. Once the fifth solenoid valve 110 is opened, the pressure in the tank 57 forces liquid refrigerant out of the bottom of the tank 57 through the second opening 60 and the liquid line 112 into the compressor 22. The liquid refrigerant cools the compressor motor 24 and the compressor 22. The compressor 22 then compresses the refrigerant before forcing the refrigerant out of the discharge 28 to be recycled through the refrigeration system 10.

When the fifth solenoid valve 110 is opened, less refrigerant is directed through the evaporator coil 84, thereby reducing the cooling capacity of the refrigeration system 10. Therefore, after the compressor temperature or the discharge pressure drop below the maximum allowable temperature and pressure values or after a predetermined time period, the controller 100 is programmed to close the fifth solenoid valve 110, increasing the flow of refrigerant through-the evaporator 84 and increasing the rate of cooling of the air-conditioned space 14. If either or both of the compressor temperature and discharge pressure again rise above the maximum allowable values after the fifth solenoid valve 110 is closed, the controller 100 is programmed to wait a predetermined time period (e.g., two minutes) and reopen the fifth solenoid valve 110. This process is repeated until the compressor temperature and discharge pressure drop below the maximum allowable values.

In some cases, particularly when the ambient temperature is below the set point temperature SP, it may be necessary to heat the air-conditioned space 14. In these cases, the controller 100 is programmed to operate the refrigeration system 10 in the heating mode. When the controller 100 determines that heating is required, the controller 100 closes the adjustable throttling device 96 and the first solenoid valve 38 and opens the second solenoid valve 40. Also, the third solenoid valve 56 remains closed. Because the first solenoid valve 38 is closed, refrigerant is not allowed to enter the condenser coil 48. However, some residual refrigerant may remain in the condenser coil 48 even after the first solenoid valve 38 is closed. It is desirable to evacuate most of the refrigerant from the condenser coil 48 at the beginning of operation in the heating mode because any refrigerant that remains in the condenser coil 48 is unavailable for heating and therefore reduces the heating capacity of the refrigeration system 10. Therefore, at the beginning of operation in the heating mode, the controller 100 is programmed to operate the refrigeration system 10 in a first or condenser evacuation phase. In the condenser evacuation phase, the fourth solenoid valve 94 is opened, and the compressor 22 operates to create an area of reduced pressure adjacent the inlet 26, thereby drawing residual refrigerant out of the condenser coil 48 into the compressor 22 via a line 111 and the fourth solenoid valve 94.

Once the condenser coil 48 has been evacuated or after a predetermined time period, the controller 100 enters a second heating phase. Alternatively, the controller 100 can be programmed to enter the second heating phase when a pressure sensor (not shown) determines that a desired suction pressure has been achieved in the line 53. In the second heating phase, the controller 100 closes the fourth solenoid valve 94 and opens the third solenoid valve 56. In this manner, refrigerant flows along a heating circuit 118 (represented by arrows) from the compressor 22 through the branch 36, the bypass 98, and through a pan heater 120.

The warm gas continues along the heating circuit 118 from the pan heater 120 through the distributor 82 and into the evaporator coil 84. Air-conditioned space air is blown past the evaporator coil 84 by the blower 86 to facilitate heat transfer between the warm refrigerant in the evaporator coil 84 and the air-conditioned space air. The air-conditioned space air is heated by contact with the warm evaporator coil 84 and is then returned to the air-conditioned space 14 to raise the temperature of the air-conditioned space 14. The refrigerant continues out of the evaporator coil 84 along the heating circuit 118 through the vapor line 88, the vapor portion of the heat exchanger 90, the second check valve 92, the tank 57, the first fixed throttling device 55, and the third solenoid valve 56, and is returned to the compressor 22 to be recycled through the refrigeration system 10.

Preferably, the controller 100 monitors the temperature and pressure of the refrigerant exiting the compressor 22 during operation in the heating mode via sensors (not shown), at least some of which are located adjacent the discharge 28. Additionally, the controller 100 preferably adjusts the temperature and pressure in the heating circuit 118 in response to data collected by the sensors by opening and closing the first fixed throttling device 55 and by selectively injecting liquid refrigerant into the compressor 22 via the liquid injection line 108. Alternatively or in addition, if the pressure of the heating circuit 118 rises above a desired operating pressure, the controller 100 is programmed to reduce the operating speed of the compressor 22. Also, if the pressure in the heating circuit 118 remains above the desired operating pressure after the compressor speed has been reduced, the controller 100 is programmed to open the first solenoid valve 38. Once the first solenoid valve 38 is opened, at least some of the refrigerant is directed through the condenser 42 and is condensed to a liquid and stored there.

To further reduce the pressure in the heating circuit 118, to reduce the load experienced by the compressor 22, or to modulate the temperature of the air-conditioned space 14, the controller 100 is programmed to close the third solenoid valve 56 and to open the adjustable throttling device 96. If the pressure in the heating circuit 118 drops below the desired pressure range, the controller 100 is programmed to reestablish pressure in the heating circuit 118 by reinitiating the condenser coil evacuation phase, as described above.

During operation in the cooling mode, water vapor from the air-conditioned space 14 can condense on the evaporator coil 84 and form frost if the coil temperature is below freezing. To remove frost from the evaporator coil 84, the controller 100 is programmed to operate the refrigeration system 10 in the defrost mode. In various applications of the present invention, the defrost mode can be initiated in a number of manners. For example, the controller 100 can initiate the defrost mode at predetermined intervals (e.g., every two hours). Alternatively or in addition, the controller 100 can be programmed to initiate the defrost mode, based on temperature and pressure data collected by sensors (not shown) distributed throughout the refrigeration system 10.

As discussed above with respect to operation in the heating mode, refrigerant can occasionally accumulate in the condenser coil 48. The accumulation of refrigerant in the condenser coil 48 reduces the amount of refrigerant available for defrosting the evaporator coil 84. Additionally, the accumulation of refrigerant in the condenser coil 48 causes a drop in the discharge pressure and temperature of the compressor 22, thereby further reducing the efficiency of the refrigeration system 10. Therefore, once the defrost mode is initiated, the controller 100 determines the pressure at the compressor discharge 28 via sensors (not shown). If the condenser discharge pressure is below an acceptable range, the controller 100 is programmed to evacuate the condenser coil 48 by opening the second and fourth solenoid valves 40, 94 and closing the adjustable throttling device 96, the first solenoid valve 38, and the third solenoid valve 56. In this manner, the compressor 22 draws most or all of the refrigerant out of the condenser coil 48, thereby increasing the pressure in the refrigeration system 10.

Once the discharge pressure reaches the acceptable pressure range, the controller 100 closes the fourth solenoid valve 94 and opens the third solenoid valve 56. Refrigerant then travels along a defrost circuit 126 (represented by arrows) from the discharge 28 via the second branch 36 into the bypass 98. From the bypass 98, refrigerant continues along the defrost circuit 126 through the pan heater 120. From the pan heater 120, the refrigerant travels through the distributor 82 into the evaporator coil 84 to defrost the evaporator coil 84. The blower 86 is preferably turned off during operation in the defrost mode so that heat is not transferred from the evaporator coil 84 into the air-conditioned space 14.

After passing through the evaporator coil 84, the refrigerant travels along the defrost circuit 126 through the vapor portion 90 of the heat exchanger 76 and the second check valve 92 before entering the tank 57. Additionally, as mentioned above, during operation in the defrost mode, the third solenoid valve 56 is opened, the fourth solenoid valve 94 is closed, and the adjustable throttling device 96 is closed.

Therefore, the refrigerant flows out of the tank 57 along the defrost circuit 126 past the first throttling device 55 into the compressor inlet 26.

If the discharge pressure rises above the desired pressure range during operation in the defrost mode, the controller 100 is programmed to open the first solenoid valve 38, thereby diverting at least some of the refrigerant from the defrost circuit 126 and into the condenser 42 where the superheated gas refrigerant is condensed into a liquid and stored. If after opening the first solenoid valve 38 the controller 100 determines that the discharge pressure is still above the desired pressure range, the controller 100 is programmed to close the third solenoid valve 56 and open the adjustable throttling device 96. Thus, the suction pressure can be reduced, which causes a drop in the discharge pressure. If the discharge temperature rises above the maximum allowed discharge temperature, the controller 100 is programmed to inject liquid refrigerant into the compressor 22 to cool the compressor 22 and/or the compressor motor 24. The controller 100 is programmed to inject liquid refrigerant into the compressor 22 through the liquid injection line 108 by opening the liquid injection valve 109 and/or by opening the fifth solenoid valve 110, as described above with respect to operation in the heating mode.

During normal operation in the cooling, heating, and defrost modes, oil used for lubricating the compressor 22 commonly mixes with the refrigerant. Over time a substantial quantity of oil is mixed with the refrigerant and is removed from the compressor 22. During operation in the cooling mode, the oil discharged from the compressor 22 is mixed with the refrigerant and follows the same path as the refrigerant.

However, during operation in the heating and defrost modes, because the refrigerant is in a mostly saturated vapor state and the oil is in a liquid state as the mix enters the tank 57, the refrigerant and oil are separated as the mixture enters the tank 57. More specifically, the vaporous refrigerant remains at the top of the tank 57 while the liquid oil settles to the bottom of the tank 57. During operation in the heating and defrost modes, oil is periodically removed from the bottom of the tank 57 through the second opening 60 and is returned to the compressor 22 via the second branch 68 through the throttling device 69, the third solenoid valve 56, and the inlet 26.

FIG. 2 shows a refrigeration system 10 according to a second embodiment of present invention, which is substantial similar to the previously described embodiment. For simplicity, like parts have been labeled with like reference numbers and only differences between the first and second embodiments will be described in detail hereafter.

In the second embodiment of the present invention, the fifth solenoid valve 110 is located along a defrost/heating bypass 130, which extends between the internal heat exchanger 76 and the pan heater 120. When the fifth solenoid valve 110 is closed, refrigerant flows from the internal heat exchanger 76 through the expansion valve 80 and into the distributor 82. When the fifth solenoid valve 110 is open, the refrigerant flows out of the internal heat exchanger 76 into the defrost/heating bypass 130, the pan heater 120, and into the distributor 82, bypassing the expansion valve 80.

With reference to operation in the cooling mode, the refrigeration circuit 20 extends from the compressor 22 through the condenser 42, the tank 57, and the internal heat exchanger 76. From the internal heat exchanger 76, the refrigeration circuit 20 extends through the expansion valve 80, the distributor 82, the evaporator coil 84, the vapor portion 90 of the internal heat exchanger 76, the adjustable throttling device 96, and back into the compressor 22.

As mentioned above with respect to the first embodiment, the discharge pressure of the compressor 22, the cooling capacity, and the compressor load of the refrigeration circuit 20, are controlled by opening and closing the adjustable throttling device 96, opening and closing the second solenoid valve 40 and adjusting the compressor speed. In some cases, particularly during startup and when the ambient temperature is relatively high, the adjustable throttling device 96 is incremented to reduce the flow of refrigerant through the refrigeration circuit 20. However, when the refrigerant flow is reduced beyond a minimum flow rate, the cooling capacity of the refrigeration circuit 20 may not be sufficient to adequately cool the compressor 22 and the compressor motor 24. In these cases, to prevent the compressor 22 and compressor motor 24 from overheating, the controller 100 is programmed to open the fifth solenoid valve 110. When the fifth solenoid valve 110 is opened, at least some of the refrigerant bypasses the expansion valve 80 and flows through the distributor orifice 82. The small pressure reduction caused by the distributor orifice 82 causes the refrigerant to flood the evaporator coil 84. Once the evaporator coil 84 is flooded, liquid refrigerant flows out of the evaporator coil 84, through the vapor portion 90 of the internal heat exchanger 76, through the adjustable throttling device 96, and back into the compressor 22, cooling the compressor 22 and the compressor motor 24.

After the compressor temperature or the discharge pressure drop below the maximum allowable temperature or pressure values or after a predetermined time period, the controller 100 is programmed to close the fifth solenoid valve 110. The refrigerant again flows through the expansion valve 80, the distributor 82, and the evaporator 84, cooling the air-conditioned space 14. If either or both of the compressor temperature or discharge pressure again rise above the maximum allowable values after the fifth solenoid valve 110 is closed, the controller 100 is programmed to wait a predetermined time period and reopen the fifth solenoid valve 110. This process is repeated until the compressor temperature and discharge pressure drop below the maximum allowable values.

The second embodiment of the refrigeration system 10 is also operable in a heating mode. During operation in the heating mode, refrigerant is directed through the heating circuit 118. However, as with the first embodiment, the controller 100 is programmed to evacuate residual refrigerant from the condenser coil 48 before directing refrigerant through the heating circuit 118. After a substantial quantity of refrigerant has been evacuated from the condenser coil 48, the controller 100 directs refrigerant through the heating circuit 118. The heating circuit 118 (represented by arrows) extends from the discharge 28, through the branch 36, the second solenoid valve 40, the bypass 98, the liquid line 78, the fifth solenoid valve 110, the defrost/heating line 130, the pan heater 120, the evaporator coil 84, the vapor portion 90 of the internal heat exchanger 76, the second check valve 92, the tank 57, and back into the compressor 22.

With reference now to operation in the defrost mode, the controller 100 is programmed to evacuate residual refrigerant from the condenser coil 48 prior to directing refrigerant through the defrost circuit 126 as described above with respect to the previous embodiment. Once the condenser coil 48 has been evacuated, refrigerant flows out of the discharge into the defrost circuit 126. The defrost circuit 126 (represented by arrows 126) extends through the branch 36, the bypass 98, the liquid line 78, the fifth solenoid valve 110, the pan heater 120, the evaporator coil 84 where hot gas melts the frost or ice that has accumulated on the evaporator coil 84, the vapor portion 90 of the internal heat exchanger 76, the second check valve 92, the tank 57, the fixed throttling device 55, and through the third solenoid valve 56 back into the compressor 22.

The embodiments described above and illustrated in the drawings are presented by way of example only and are not intended as a limitation upon the concepts and principles of the present invention. As such, it will be appreciated by one having ordinary skill in the art, that various changes in the elements and their configuration and arrangement are possible without departing from the spirit and scope of the present invention as set forth in the appended claims.

For example, the present invention is described herein as being used to pull down and maintain the temperature in a truck having a single air-conditioned space 14. However, one having ordinary skill in the art will appreciate that the present invention could also be used in trucks or trailers having multiple air-conditioned spaces 14. Similarly, the present invention can also be used to pull down and maintain the temperature in buildings, containers, A/C applications and the like.

Similarly, the present invention is described herein as including a first, second, third, fourth, and fifth solenoid valves. One having ordinary skill in the art will appreciate that in other applications stepper motors and other valve controls could also or alternatively be used. Also, one having ordinary skill in the art will appreciate that adjustable valves, pulse valves, expansion valves, or the like could also or alternatively be used to provide additional mass flow rates and additional modes of operation.

As such, the functions of the various elements and assemblies of the present invention can be changed to a significant degree without departing from the spirit and scope of the present invention.

What is claimed is:

1. A transportation refrigeration system operable in a cooling mode and a heating mode to condition air in an air-conditioned space, the system comprising:
    a refrigeration circuit having refrigerant and fluidly connecting a compressor, a condenser, a tank, and an evaporator, the evaporator being in thermal communication with the air-conditioned space, the refrigerant being directed through the refrigeration circuit during operation in the cooling mode; and
    a heating circuit fluidly connecting the compressor, the tank, the evaporator, and a heater, the refrigerant being directed through the heating circuit during operation in the heating mode, the refrigerant being evacuated from the refrigeration circuit during operation in the heating mode.

2. The transportation refrigeration system of claim 1, wherein the transportation refrigerant is operable in a defrost mode, and wherein a defrost circuit fluidly connects the compressor, the tank, the evaporator, and the heater, the refrigerant being evacuated from the refrigeration circuit during operation in the defrost mode.

3. The transportation refrigeration system of claim 1, wherein the transportation refrigerant is operable in a defrost mode, and wherein a defrost circuit fluidly connects the compressor, the tank, the evaporator, and the heater, and further comprising a controller operable to selectively direct the refrigerant through the refrigeration circuit, the defrost circuit, and the heating circuit during operation in the cooling mode, the defrost mode, and the heating mode, respectively.

4. The transportation refrigeration system of claim 1, wherein the transportation refrigerant is operable in a defrost mode, and wherein a defrost circuit fluidly connects the compressor, the tank, the evaporator, and the heater, and further comprising a plurality of adjustable valves distributed throughout the refrigeration system, the plurality of valves being operable to selectively alter the flow of the refrigerant through the refrigeration circuit, the heating circuit, and the defrost circuit.

5. The transportation refrigeration system of claim 1, wherein the transportation refrigerant is operable in a defrost mode, and wherein a defrost circuit fluidly connects the compressor, the tank, the evaporator, and the heater, and wherein the tank includes a first opening, a second opening, and a third opening, the refrigeration circuit coupled to the first opening and the second opening, the heating circuit coupled to the first opening and the third opening, and the defrost circuit coupled to the first opening and the third opening.

6. The transportation refrigeration system of claim 5, wherein the tank has a base and the first opening is spaced a first distance above the base and the third opening is spaced a second distance above the base, and the first distance is greater than the second distance.

7. A transportation refrigeration system operable in a cooling mode, a defrost mode, and a heating mode to condition air in an air-conditioned space, the system comprising:
   a refrigeration circuit fluidly connecting a compressor, a condenser, a tank, and an evaporator, the evaporator being in thermal communication with the air-conditioned space;
   a heating circuit fluidly connecting the compressor, the tank, the evaporator, and a heater; and
   a defrost circuit fluidly connecting the compressor, the tank, the evaporator, and the heater; wherein a quantity of oil is mixed with the refrigerant in the compressor, the tank separating at least some of the oil from the refrigerant.

8. A transportation refrigeration system for conditioning air in an air-conditioned space, the refrigeration system comprising:
   a storage tank having a first opening, a second opening, and a third opening;
   a refrigeration circuit coupled to the first and second openings and being in thermal communication with the air-conditioned space;
   a heating circuit coupled to the first and third openings and being in thermal communication with the air-conditioned space; and
   a defrost circuit coupled to the first and third openings, wherein the tank separates oil and refrigerant from an oil/refrigerant mixture.

9. A method of conditioning air in an air-conditioned space with a transportation refrigeration system, the refrigeration system housing a refrigerant, the method comprising:
   directing substantially all of the refrigerant through a refrigeration circuit during operation in a cooling mode, the refrigeration circuit including a tank and an evaporator, the evaporator being in thermal communication with the air-conditioned space;
   directing substantially all of the refrigerant through a heating circuit during operation in a heating mode, the heating circuit including the tank, the evaporator coil, and a heater; and
   directing substantially all of the refrigerant through a defrost circuit during operation in a defrost mode, the defrost circuit extending through the tank, the heater, and the evaporator.

10. The method of claim 9, wherein the refrigeration circuit includes a condenser, the method further comprising removing refrigerant from the condenser before initiating the heating mode.

11. The method of claim 9, wherein the refrigeration circuit includes a condenser, the method further comprising removing refrigerant from the condenser before initiating the defrost mode.

12. A method of conditioning air in an air-conditioned space with a transportation refrigeration system, the refrigeration system housing a refrigerant, the method comprising:
   directing substantially all of the refrigerant through a refrigeration circuit during operation in a cooling mode, the refrigeration circuit including a tank and an evaporator, the evaporator being in thermal communication with the air-conditioned space;
   directing substantially all of the refrigerant through a heating circuit during operation in a heating mode, the heating circuit including the tank, the evaporator coil, and a heater;
   directing substantially all of the refrigerant through a defrost circuit during operation in a defrost mode, the defrost circuit extending through the tank, the heater, and the evaporator; and
   mixing a quantity of oil with the refrigerant in the compressor and separating at least some of the oil from the refrigerant in the tank.

13. The method of claim 12, further comprising moving the oil from the tank to the compressor.

14. A method of conditioning air in an air-conditioned space with a transportation refrigeration system, the method comprising:
   directing a refrigerant along a refrigeration circuit through a compressor, a condenser, a tank, and an evaporator coil;
   removing substantially all of the refrigerant from the condenser;
   directing the refrigerant along a heating circuit through the compressor, the tank, a heater, and the evaporator coil;
   moving air from an air-conditioned space across the evaporator coil, transferring heat between the air and the evaporator coil, and returning the air to the air-conditioned space; and
   separating an oil and the refrigerant from an oil/refrigerant mixture.

15. The method of claim 14, further comprising mixing a quantity of oil with the refrigerant in the compressor and separating at least some of the oil from the refrigerant in the tank.

16. A transportation refrigeration system operable in a cooling mode, a defrost mode, and a heating mode to condition air in an air-conditioned space, the system comprising:
   a refrigeration circuit fluidly connecting a compressor, a condenser, a tank, and an evaporator, the evaporator being in thermal communication with the air-conditioned space;
   a heating circuit fluidly connecting the compressor, the tank, the evaporator, and a heater; and a defrost circuit fluidly connecting the compressor, the tank, the evaporator, and the heater;

a first flow path extending between the compressor and the condenser, the first flow path including a first valve having a first open condition allowing the flow of fluid along the first flow path and a first closed condition preventing flow of fluid along the first flow path;

a second flow path extending between the condenser and the tank, the second flow path having a check valve operable to prevent fluid flow into the condenser;

a third flow path extending between the compressor and the evaporator, the third flow path including a second valve having a second open condition allowing the flow of fluid along the third flow path and a second closed condition preventing flow of fluid along the third flow path;

a fourth flow path extending between the compressor and the tank, the fourth flow path including a third valve having a third open condition allowing the flow of fluid along the fourth flow path and a third closed condition preventing flow of fluid along the fourth flow path;

a fifth flow path extending between the condenser and the compressor, the fifth flow path including a fourth valve having a fourth open condition allowing the flow of fluid along the fifth flow path and a fourth closed condition preventing flow of fluid along the fifth flow path; and a sixth flow path extending between the evaporator and the compressor, the sixth flow path having a fifth valve operable to regulate flow between the evaporator and the compressor.

17. The transportation refrigeration system of claim 16, further comprising:

a seventh flow path fluidly connecting the tank and the evaporator; and a bypass having a first end and a second end coupled to the seventh flow path, the bypass including an expansion valve and a sixth valve having a sixth open condition allowing the flow of fluid along the bypass and a sixth closed condition preventing flow of fluid along the bypass.

18. The transportation refrigeration system of claim 16, further comprising a liquid line extending between the tank and the compressor, the liquid line including a liquid injection valve having an open injection condition allowing the flow of fluid along the liquid line and a closed injection condition preventing flow of fluid along the liquid line.

19. The transportation refrigeration system of claim 18, wherein the compressor has an inlet, an outlet, and an injection port, and wherein the liquid line is connected to the injection port.

20. The transportation refrigeration system of claim 18, wherein the injection valve is movable between the open injection condition and the closed injection condition to control compressor temperature.

21. The transportation refrigeration system of claim 16, wherein the compressor has an inlet, an outlet, and an injection port, and wherein the first flow path is connected to the outlet, the third flow path is connected to the outlet, the fourth flow path is connected to the inlet, the fifth flow path is connected to the inlet, and the sixth flow path is connected to the inlet.

22. The transportation refrigeration system of claim 16, wherein the refrigeration circuit includes the first flow path, the second flow path, and the sixth flow path, the defrost circuit includes the third flow path, the fifth flow path, and the sixth flow path, and the heating circuit includes the third flow path, the fifth flow path, and the sixth flow path.

23. The transportation refrigeration system of claim 16, wherein during operation in the cooling mode the first valve is in the first open condition, the second valve is in the second closed condition, the third valve is in the third closed position, and the fourth valve is in the fourth closed position, during operation in the heating mode, the first valve is in the first closed condition and the second valve is in the second open condition, and during operation in the defrost mode, the first valve is in the first closed condition and the second valve is in the second open condition.

24. The transportation refrigeration system of claim 16, wherein the heating mode and the defrost mode include an evacuation phase, and wherein in the evacuation phase the first valve is in the first closed condition and the fourth valve is in the fourth open condition.

25. The transport refrigeration system of claim 24, wherein the refrigeration system includes a refrigerant, and wherein during the evacuation phase substantially all of the refrigerant is removed from the condenser.

26. The transportation refrigeration system of claim 16, wherein the transportation refrigeration system houses a refrigerant and includes a controller, the controller monitors pressure in the heating circuit and the defrost circuit, and wherein if the pressure rises above a desired level, the controller moves the first valve to the first open condition, diverting at least some of the refrigerant into the condenser.

27. The transportation refrigeration system of claim 16, wherein the tank includes a first opening, a second opening, and a third opening, and wherein the second flow path is connected to the first opening and the fourth flow path is connected to the second opening.

28. The transportation refrigeration system of claim 27, wherein the refrigeration system houses a refrigerant and the compressor houses oil, during operation in the cooling mode, the defrost mode, and the heating mode, the refrigerant and the oil mix to form a refrigerant/oil mix, during operation in the heating mode and the defrost mode, the refrigerant/oil mix enters the tank through the third opening, the oil accumulates adjacent to the second opening and the refrigerant accumulates adjacent to the first opening.

29. The transportation refrigeration system of claim 28, wherein during operation in the heating mode and the defrost mode, the third valve is movable to the third open condition, and wherein when the third valve is in the third open condition, the compressor draws oil out of the tank via the second opening.

30. The transportation refrigeration system of claim 16, further comprising a vapor path extending between the tank and the sixth flow path, the vapor path intersecting the sixth flow path between the fifth valve and the evaporator, and wherein the heating circuit and the defrost circuit extend through the vapor path.

31. The transportation refrigeration system of claim 16, wherein the sixth valve is movable between the sixth open condition and the sixth closed condition to control compressor temperature.

32. A transportation refrigeration system operable in a cooling mode and a heating mode to condition air in an air-conditioned space, the system comprising:

a refrigeration circuit having refrigerant and fluidly connecting a compressor, a condenser, a tank, and an evaporator, the evaporator being in thermal communication with the air-conditioned space; and a heating circuit fluidly connecting the compressor, the tank, the evaporator, and a heater, substantially all of the refrigerant being directed through the heating circuit during operation in the heating mode.

33. The transportation refrigeration system of claim 32, further comprising a controller operable to selectively direct a quantity of the refrigerant through the refrigeration circuit and the heating circuit.

34. The transportation refrigeration system of claim 32, further comprising a plurality of adjustable valves distributed throughout the refrigeration system, the plurality of adjustable valves being operable to selectively alter the flow of the refrigerant through the refrigeration circuit and the heating circuit.

35. The transportation refrigeration system of claim 32, wherein the transportation system is operable in a defrost mode, and further comprising a defrost circuit fluidly connecting the compressor, the tank, the evaporator, and the heater, substantially all of the refrigerant being directed through the defrost circuit during operation in the defrost mode.

36. The transportation refrigeration system of claim 35, wherein the refrigerant is evacuated from the refrigeration circuit during operation in the defrost mode.

37. The transportation refrigeration system of claim 32, wherein the refrigerant is evacuated from the refrigeration circuit during operation in the heating mode.

38. A transportation refrigeration system operable in a cooling mode and a defrost mode to condition air in an air-conditioned space, the system comprising:
  a refrigeration circuit having refrigerant and fluidly connecting a compressor, a condenser, a tank, and an evaporator, the evaporator being in thermal communication with the air-conditioned space; and
  a defrost circuit fluidly connecting the compressor, the tank, the evaporator, and a heater, substantially all of the refrigerant being directed through the defrost circuit during operation in the defrost mode.

* * * * *